(12) United States Patent
Betts

(10) Patent No.: US 6,715,124 B1
(45) Date of Patent: Mar. 30, 2004

(54) TRELLIS INTERLEAVER AND FEEDBACK PRECODER

(75) Inventor: William L. Betts, Petersburg, FL (US)

(73) Assignee: Paradyne Corporation, Largo, FL (US)

( * ) Notice: Subject to any disclaimer, the term of this patent is extended or adjusted under 35 U.S.C. 154(b) by 472 days.

(21) Appl. No.: 09/777,417

(22) Filed: Feb. 6, 2001

Related U.S. Application Data
(60) Provisional application No. 60/182,323, filed on Feb. 14, 2000.

(51) Int. Cl.[7] .................... H03M 13/03; H04L 5/12
(52) U.S. Cl. .................................. 714/792; 375/265
(58) Field of Search ................... 714/792; 375/265, 375/287

(56) References Cited

U.S. PATENT DOCUMENTS

| | | | |
|---|---|---|---|
| 4,677,624 A | 6/1987 | Betts et al. | 371/43 |
| 4,677,625 A | 6/1987 | Betts et al. | 371/43 |
| 4,677,626 A | 6/1987 | Betts et al. | 371/43 |
| 5,023,889 A * | 6/1991 | Divsalar et al. | 375/244 |
| 5,103,227 A | 4/1992 | Betts | 341/61 |
| 5,216,694 A * | 6/1993 | Wei | 375/286 |
| 5,243,627 A | 9/1993 | Betts et al. | 375/39 |
| 5,265,127 A | 11/1993 | Betts et al. | 375/39 |
| 5,301,209 A * | 4/1994 | Wei | 375/265 |
| 5,559,835 A * | 9/1996 | Betts | 375/265 |
| 5,583,889 A * | 12/1996 | Citta et al. | 375/341 |
| 5,600,677 A * | 2/1997 | Citta et al. | 375/296 |
| 5,784,405 A | 7/1998 | Betts et al. | 375/222 |
| 5,878,077 A * | 3/1999 | Betts | 375/222 |
| 6,034,996 A * | 3/2000 | Herzberg | 375/265 |
| 6,141,384 A * | 10/2000 | Wittig et al. | 375/240.25 |
| 6,201,836 B1 * | 3/2001 | Kim | 375/265 |
| 6,496,741 B1 * | 12/2002 | Whiffen | 700/28 |

OTHER PUBLICATIONS

ITU—Telecommunications Standardization Sector, G.gen: Mitigation of Modulated RF Ingress, Temporary Document CF–xxx; Jan., 8–12, 2001.
ITU—Telecommunications Standardization Sector, Interleaver for 4–Dimensional Trellis Codes, No. PCM'00–04; Apr., 25–28, 2000.
Telecommunications Industry Association (TIA), Data Frame Realignment to Reduce RBS/Trellis Affected Symbol Coincidence for Recommendation V.92, No. TR–30.1/00–03–32; Mar., 22–23, 2000.
ITU—Telecommunications Standardization Sector, Inverse Map for Recommendation V.92, No. D.384 (WP 1/16); Feb. 7–18, 2000.
ITU—Telecommunication Standardization Sector, Combined Coding and Precoding for Recommendation V.92, No. D.382 (WP 1/16); Feb. 7–18, 2000.

* cited by examiner

Primary Examiner—Albert Decady
Assistant Examiner—Esaw Abraham
(74) Attorney, Agent, or Firm—Thomas, Kayden, Horstemeyer & Risley LLP

(57) ABSTRACT

A communication system containing a constellation encoder, a feedback precoder, and an interleaver that is coupled to the feedback precoder, enables efficient trellis encoding by preventing adjacent transmit symbols from having the same trellis symbol. Consequently, the adverse impact of quantization noise that may occur over adjacent transmitted symbols is minimized. The constellation encoder uses redundant bits that are generated by a trellis encoder connected to the interleaver, the redundant bits being added to an input stream of data bits being provided to the communication system for transmission. The trellis encoder generates the redundant bits based on the interleaved storage of trellis symbols bits in the interleaver.

28 Claims, 5 Drawing Sheets

TRELLIS INTERLEAVER AND FEEDBACK PRECODER

CROSS REFERENCE TO RELATED APPLICATION

This document claims priority to and the benefit of the filing date of co-pending and commonly assigned U.S. Provisional Patent Application entitled TRELLIS INTERLEAVER AND FEEDBACK PRECODER, assigned Ser. No. 60/182,323, and filed Feb. 14, 2000, hereby incorporated by reference.

TECHNICAL FIELD

The invention relates generally to data communications, and more particularly, to reducing errors in a data communications system.

BACKGROUND OF THE INVENTION

Data communication typically occurs as the transfer of information from one communication device to another. This is typically accomplished by the use of a modem located at each communication endpoint. In the past, the term modem denoted a piece of communication apparatus that performed a modulation and demodulation function, hence the term "modem". Today, the term modem is typically used to denote any piece of communication apparatus that enables the transfer of data and voice information from one location to another. For example, modern communication systems use many different technologies to perform the transfer of information from one location to another. Digital subscriber line (DSL) technology is one vehicle for such transfer of information. DSL technology uses the widely available subscriber loop, the copper wire pair that extends from a telephone company central office to a residential location, over which communication services, including the exchange of voice and data, may be provisioned. DSL devices can be referred to as modems, or, more accurately, transceivers, which connect the telephone company central office (CO) to the user, or remote location, typically referred to as the customer premises (CP). DSL communication devices use different formats and different types of modulation schemes and achieve widely varying communication rates. However, even the slowest DSL communications devices achieve data rates far in excess of conventional point-to-point modems.

Some of the available modulation schemes include pulse amplitude modulation (PAM), quadrature-amplitude modulation (QAM), carrierless amplitude/phase (CAP) and discrete multi-tone (DMT). Trellis coding is a well-known technique for encoding the modulated signal in order to reduce errors. In conventional trellis coding, a redundant bit is generated for some number of transmitted symbols and the redundant trellis bit is added to adjacent symbols. Unfortunately, in some communication systems, such as those that use PAM encoding with 8-bit (256 level) mu-law analog-to digital converters, which operate at a sample rate equal to the symbol rate of the transmitter, the quantization noise (the noise that results when low capacity analog-to-digital converters are used) can be so severe that local receiver equalization is impractical. In such a case, the remote transmitter pre-equalizes the transmit signal such that the receive analog-to-digital converter slices the signal at its 256 prescribed levels. In dial modems, which use the switched telephone network, one of the dominant impairments is echo from the local mu($\mu$)-law transmitter. The mu-law transmitter generates echo quantization noise, which varies from symbol to symbol depending on the mu-law segment being transmitted. Conventional communications devices use a precoder to whiten the noise. This is appropriate for channels that have linear distortion and white noise. Unfortunately, the quantization noise on the echo is independent of the channel and varies from symbol to symbol. The remote transmitter has no knowledge of the signal transmitted by the local transmitter and the remote precoder and pre-equalization filter cannot compensate for the quantization noise at the local transmitter.

This quantization noise typically spans adjacent symbols, thereby making convention trellis coding, which encodes adjacent symbols, ineffective because adjacent symbols may be corrupted with the noise. DSL modems, such as symmetric DSL (SDSL), utilize conventional Tomlinson precoders, which require the use of square signal constellations without shaping gain. Interleaving, such as that defined in commonly assigned U.S. Pat. No. 4,677,625, to Betts et al., entitled "Distributed Trellis Encoder," can protect the trellis encoders in these DSL modems.

Therefore, it would be desirable to trellis code a transmit signal such that the effect of quantization noise on adjacent transmit symbols can be minimized or eliminated.

SUMMARY

The invention enables a communication device to efficiently trellis encode a transmit signal by using a trellis interleaver and feedback precoder to trellis encode non-adjacent transmit symbols. A transmit signal is precoded and a precoder state element located in the transmitter of a communications device collects and forwards the precoder state of the last precoded transmit symbol to a plurality of registers. A multi-dimensional trellis symbol may include multiple transmit symbols or PAM pulses. As the precoder state of each symbol is determined, each successive symbol is interleaved into a plurality (n) of parallel registers. On the last n symbols, a trellis encoder uses the contents of these last n registers (the last n symbols) to produce n sequential redundant bits for trellis encoding the n trellis symbols. Thus, the trellis symbols are interleaved. The registers contain the transmit symbols arranged such that each register will supply one of the possible trellis symbol states, thereby preventing adjacent transmit symbols from containing the same trellis symbol. The trellis states are forwarded to a trellis encoder that develops a redundant trellis bit, which is combined with the transmit signal. The trellis interleaver and feedback precoder offers superior performance by encoding circular and shaped multi-dimensional signal constellations.

The invention prevents quantization noise that may be distributed over multiple adjacent transmit symbols from corrupting the trellis encoder and decoder by ensuring that only non-adjacent transmit symbols include the same trellis symbol.

BRIEF DESCRIPTION OF THE DRAWINGS

The invention, as defined in the claims, can be better understood with reference to the following drawings. The components within the drawings are not necessarily to scale relative to each another, emphasis instead being placed on clearly illustrating the principles of the present invention.

DETAILED DESCRIPTION OF THE INVENTION

Figure 1:
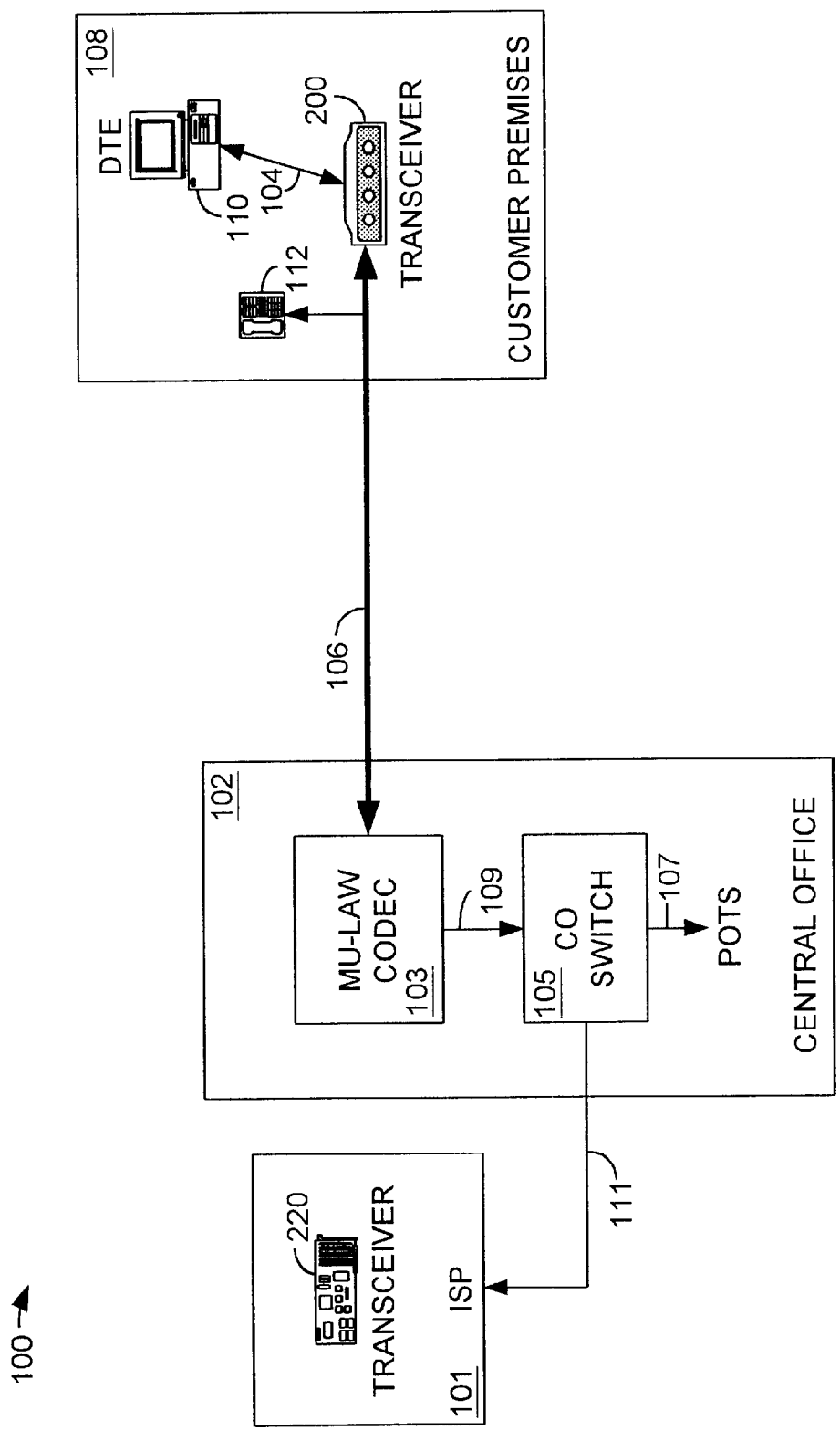
FIG. 1 is a block diagram illustrating an exemplar switched network communication environment in which the present invention resides.

Although described with particular reference to pulse amplitude modulation (PAM) and a 12 symbol PAM frame in a switched network telecommunication system, the trellis interleaver and feedback precoder of the invention can be used to reduce errors in any communication system. For example, the trellis interleaver and feedback precoder can be used in DSL systems that employ, QAM, CAP and DMT modulation formats. Further, while only the transceiver located at a customer premises location will be described in detail, it should be understood that any transceiver can include the trellis interleaver and feedback precoder.

Furthermore, the trellis interleaver and feedback precoder can be implemented in software, hardware, or a combination thereof. In a preferred embodiment, the elements of the invention are implemented in software that is stored in a memory and that configures and is executed by a suitable microprocessor ($\mu$P) or digital signal processor (DSP) situated in a communication device. The hardware portion of the invention can be implemented using specialized hardware logic. The software portion can be stored in a memory and be executed by a suitable instruction execution system (microprocessor). The hardware implementation of the trellis interleaver and feedback precoder can include any or a combination of the following technologies, which are all well known in the art: a discrete logic circuit(s) having logic gates for implementing logic functions upon data signals, an application specific integrated circuit (ASIC) having appropriate logic gates, a programmable gate array(s) (PGA), a field programmable gate array (FPGA), etc.

Furthermore, the trellis interleaver and feedback precoder software, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic or electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Turning now to the drawings, FIG. 1 is a block diagram illustrating an exemplar switched network communication environment 100 in which the present invention resides. The switched network communication environment 100, for illustrative purposes only, is a switched network communication environment. However, other communication environments are contemplated by the invention. For example, the invention contemplates the use of asymmetric (ADSL) or symmetric DSL technologies such as high bit rate DSL (HDSL), symmetric DSL (SDSL), and multi-rate SDSL (MSDSL). Furthermore, the invention contemplates other asymmetric digital subscriber line technology such as rate adaptive DSL (RADSL) and also contemplates non-DSL communications systems that use forward error correction coding and/or trellis coding.

Central office 102 connects to customer premises 108 via communication channel 106. Communication channel 106 can be the copper wire pair that typically extends between central office 102 and a remote customer location, and is commonly referred to as the "local loop," or "subscriber loop." For exemplar purposes only, the transmission scheme between central office 102 and customer premises 108 can occur within the POTS band and comply with known communication standards, such as, for example, V.34, V.90 or V.92.

However, other communication methodologies are possible between central office 102 and customer premises 108, such as variations of multi-point and half duplex as well as other line coding formats, such as QAM, CAP, DMT, etc.

Central office 102 includes a $\mu$-law coder/decoder (CODEC) adapted to receive a transmission from the transceiver 200 located at customer premises 108. The $\mu$-law CODEC communicates with central office (CO) switch 105 via connection 109. The CO switch 105 receives both the data and voice (POTS) signals from communication channel 106 and supplies the POTS signal via connection 107 to the appropriate voice communication equipment (not shown). The CO switch 105 routes the data information via connection 111 to, for example, Internet service provider (ISP) 101. The connection 111 can be, for example, a digital or analog wide area network (WAN).

For exemplar purposes only, the ISP 101 includes a transceiver 220 adapted to receive the data sent by transceiver 200 located at customer premises 108. The transceiver 220 can be one of a plurality of similar transceivers located at ISP 101.

The transceiver 200 located at customer premises 108 connects to DTE 110, while plain old telephone service (POTS) device 112 connects directly to communication channel 106. In a DSL environment, a POTS splitter or filter is typically installed between the communication channel 106 and POTS device 112 to prevent the POTS device 112 from interfering with the DSL communication and to prevent DSL signals from degrading POTS performance. DTE 110 can be a personal computer and POTS device 112 can be a typical telephone. Typically, the transceiver 200 is located in a home or office, and is used to allow access to remotely located computers or the Internet via ISP 101.

In a DSL communication environment, voice information can be simultaneously exchanged with the data over communication channel 106 and separated by a DSL transceiver (not shown) located at central office 102. Data is exchanged between customer premises 108 and central office 102 in order to allow DTE 110 to access, for example, the Internet via ISP 101. Alternatively, the DTE 110 located at the customer premises 108 may communicate with a remotely located computer, each one having one of the transceivers 200.

Although illustrated using a single customer premises 108 connected to central office 102, typically a number of customer premises locations will be connected to one central office 102 using a plurality of communication channels similar to communication channel 106. Furthermore, in a DSL communication environment, it is also possible for a number of customer premises locations to be connected to one DSL transceiver (not shown) located at a central office. However, for purposes of explanation, the invention will be described with reference to a single customer premises 108 communicating with a central office 102. Furthermore, the invention described hereafter can be embodied in both transceiver 200 located at customer premises 108 and in transceiver 220 located at central office 102. However, for ease of illustration, only a single transceiver 200 will be described below.

Generally, data and voice communication between transceiver 200 and transceiver 220 is accomplished by encoding a serial bit stream into a signal space constellation. In 2 dimensions the signal constellation includes a number of points that each represents a particular magnitude and phase of a communication signal at a given time. In single dimension PAM, each transmit symbol represents the level or magnitude of a communication signal at a given time. The number of points in the signal constellation is related to the number of bits encoded into the constellation and is also related to the available transmit power, or signal-to-noise ratio available in the communication channel. For example, with all factors being equal, a communication channel having a higher signal-to-noise ratio than another communication channel is said to have higher "margin" and is capable of communicating more bits-per-symbol (a symbol being a signal constellation point that represents n-bits) without error than the communication channel having lower margin. Circular signal constellations are generally preferred over square constellations because they offer an approximate 0.2 dB performance improvement and have a lower peak factor.

Figure 2:
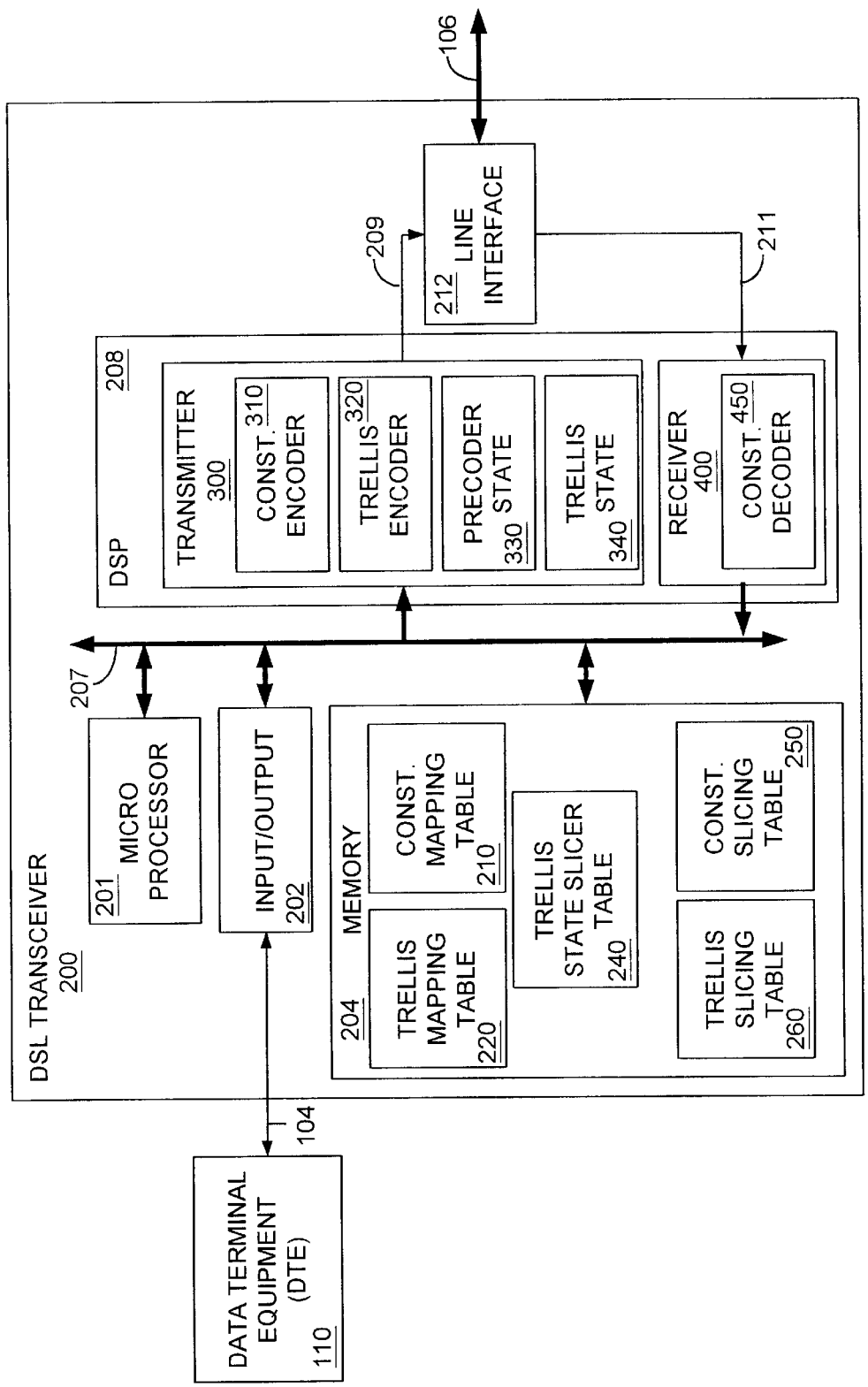
FIG. 2 is a block diagram illustrating the one of the transceivers of FIG. 1.

FIG. 2 is a block diagram illustrating the transceiver 200 of FIG. 1. Although the following discussion applies to both the transceiver 200 located at customer premises 108 and the transceiver 220 located at ISP 101, only the transceiver 200 located at the customer premises 108 will be discussed in detail. The transceiver 200 communicates with DTE 110 via connection 104 where data supplied to and received from DTE 110 is exchanged via input/output element 202 within transceiver 200. Transceiver 200 also includes microprocessor 201 and memory 204 in communication via bus 207 with digital signal processor (DSP) 208. DSP 208 includes a transmitter 300 and a receiver 400. Transmitter 300 includes constellation encoder 310, trellis encoder 320, precoder state element 330 and trellis state element 340. Constellation encoder 310 encodes a series of bits into signal points in a signal space constellation. Trellis encoder 320 generates a redundant trellis bit for a portion of the symbols (the least significant bits) in the transmit frame. Precoder state element 330 collects the trellis state for each transmit symbol (pulse in PAM) and forwards the state for each pulse to a trellis interleaver (to be described below). The output of the precoder state element 330 is used as the present precoder state of the trellis encoder and will be described in detail below. In this manner, burst errors that may corrupt several consecutive symbols are unlikely to overload the trellis decoder located in the receiver. The burst errors will be spread over multiple trellis symbols, thereby reducing the total distortion of any one trellis symbol.

Trellis state element 340 provides the trellis state of each symbol to the trellis encoder 320. Preferably, the logic for the trellis interleaver and feedback precoder is program code that is stored in the memory 204 and executed in the DSP 208. Therefore, the constellation mapping table 210, the trellis mapping table 220, and the trellis state slicer table 240, which are used with the constellation encoder 310, trellis encoder 320, and the trellis state element 340, respectively, are shown as residing within memory 204. Alternatively, the memory 204 and the microprocessor 201 may work in cooperation to store and execute the trellis interleaver and feedback precoder of the invention.

The constellation mapping table 210 stores the scalar PAM levels or vector values (the X and Y coordinates) for the code words that are used to encode the signal constellations. The constellation encoder 310 is sometimes referred to as a "mapper."

Receiver 400 includes constellation decoder 450, which decodes each signal point in the signal constellation to obtain the original bits. Similar to the constellation encoder logic, the constellation decoder logic is preferably, program code that is stored in the memory 204 and executed in the DSP 208. Therefore, constellation slicing table 250 and the trellis slicing table 260 are shown as residing within memory 204.

Alternatively, the memory 204 and the microprocessor 201 may work in cooperation to store and execute the trellis interleaver and feedback precoder of the invention. The constellation decoder 450 operates in conjunction with the constellation slicing table 250. Accordingly, the constellation slicing table 250 is shown as residing within memory 204. The constellation slicing table 250 stores the index values for the code words that are used to decode the signal constellations. The constellation decoder 450 is sometimes referred to as a "slicer" or a "demapper."

Although DSP 208 as illustrated includes the transmitter 300 and receiver 400, the transmitter 300 and receiver 400 may be implemented separately. The constellation encoder 310, trellis encoder 320, precoder state element 330, trellis state element 340, and the constellation decoder 450 enable the DSL transceiver 200 to reliably, economically and efficiently implement the trellis interleaver and feedback precoder in order to interleave the trellis bits so that consecutive transmit symbols do not include the trellis code information for the same trellis symbol.

The system described here assumes symmetric transmit and receive modulation formats. However, in common practice the upstream and downstream modulation formats may be different. For example, in conventional V.90 modems, uncoded PAM is used in the downstream direction (from the central office to the customer premises) and trellis coded QAM is used in the upstream direction (from the customer premises to the central office). In later generation V.92 modems uncoded PAM is used downstream and trellis coded PAM is used upstream. Preferably, the system described herein may be used in the upstream direction. Thus, the transmitter 300 is in the upstream transceiver 200 (located at the customer premises 108 of FIG. 1) and the receiver 400 is in the upstream receiving transceiver 220 (located at the ISP 101 or central office 102 of FIG. 1).

Transmitter 300 communicates via connection 209 with line interface 212 in order to gain access to communication channel 106. Similarly, receiver 400 receives signals from line interface 212 via connection 211.

Figure 3:
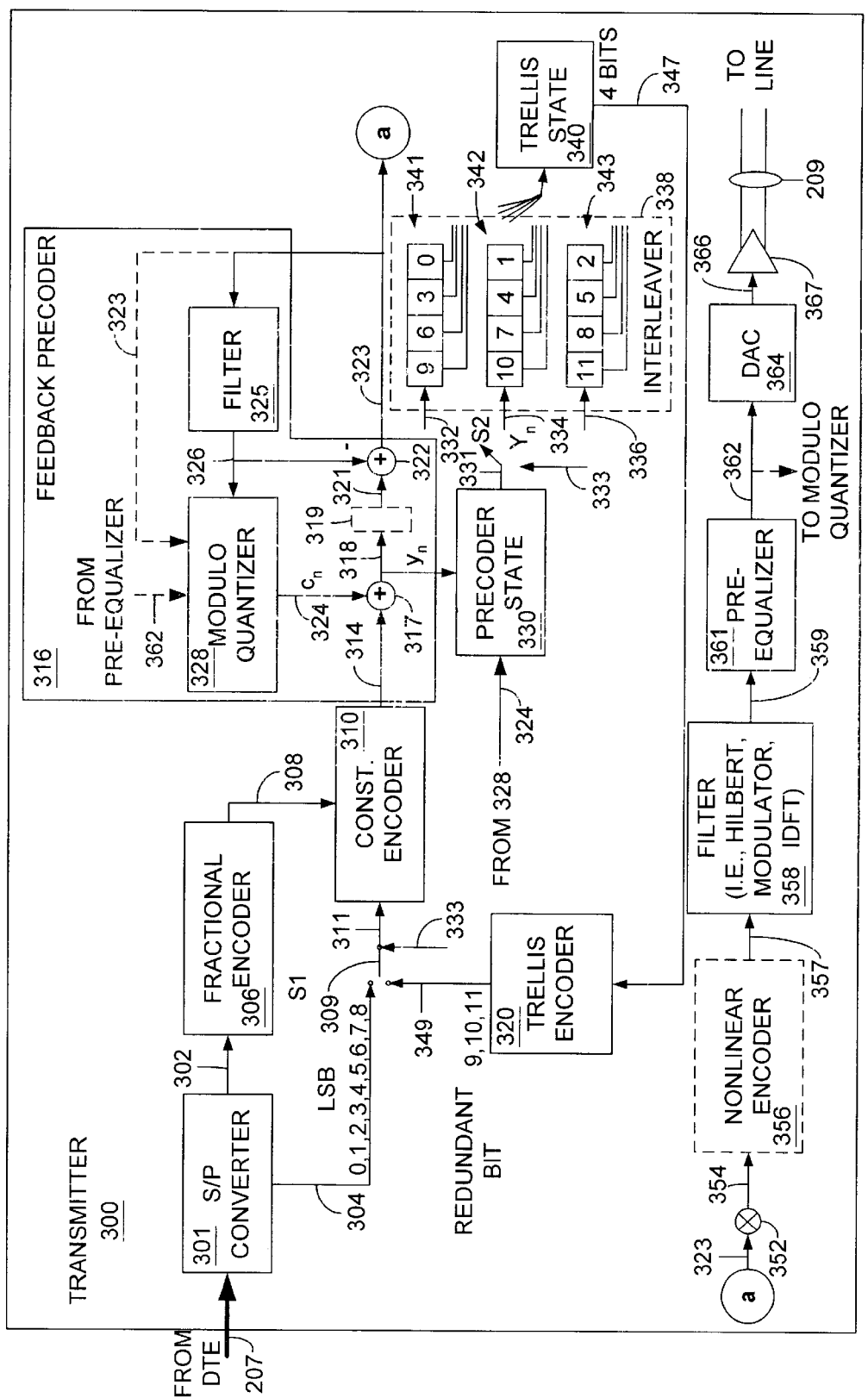
FIG. 3 is a block diagram illustrating the transmitter of FIG. 2.

FIG. 3 is a block diagram illustrating the transmitter 300 of FIG. 2. The transmitter 300 is simplified and FIG. 3 shows only the elements of the transmitter 300 that are used to describe the invention. A data signal originating in DTE 110 is communicated via bus 207 to serial-to-parallel (s/p) converter 301. The signal on connection 207 typically takes the form of a serial bit stream that is scrambled so that a scrambled serial bit stream is supplied on connection 207. The scrambler (not shown) can be either a self-synchronized scrambler or a preset free-running scrambler as is known in the art. Depending upon the application, the preset scrambler may have some advantages, as in the case where Reed-Solomon coding is used. The serial-to-parallel converter 301 supplies the higher order bits on connection 302 and supplies the least significant bits on connection 304. Depending upon the type of modulation being employed, the least significant bits on connection 304 might represent two pulses for PAM encoding, or be the two least significant bits for each word supplied to a QAM constellation encoder.

The higher order bits on connection 302 are supplied to fractional encoder 306. Although not required, fractional encoder 306 can be employed to allow the transmission of fractional bit rates as in known in the art of data communications. Fractional rate encoding can be accomplished using modulus conversion, constellation switching, or shell mapping. Modulus conversion is a well-known technique in the art of communications for allowing the transmission of fractional bit rates, and is described in U.S. Pat. No. 5,103,277. Constellation switching allows the transmission of fractional bit rates by, for example, transmitting 6 bits in one symbol and 7 bits in the next symbol if it is desired to transmit 6½ bits. For 6¾ bits 7 bits per symbol would be transmitted for three symbol cycles and 6 bits per symbol would be transmitted for the fourth symbol cycle. Shell mapping blocks the data into frames and a shell mapping algorithm is used to map the frames of data into a constellation of a certain size. The output of the fractional encoder 306 is supplied via connection 308 to constellation encoder 310. For purposes of this description, the constellation encoder 310 is a PAM encoder. However, other constellation encoding techniques, such as, for example, QAM and CAP encoding are contemplated by the invention.

The least significant bits on connection 304 are supplied through switch 309 and via connection 311 to the constellation encoder 310. During the first 9 symbol times (pulses in PAM), the switch 309 supplies the least significant bits on connection 304 to the constellation encoder. At the start of the 10$^{th}$ symbol time (the 10$^{th}$ PAM pulse), the switch 309 supplies the redundant trellis bits on connection 349 via connection 311 to the constellation encoder 310. The operation of the switch 309 is controlled via a counter signal supplied via connection 333. The counter typically begins at the end of the transceiver training sequence when all the elements in the transmitter and receiver are synchronized. The switch 309 (and the switch 331 described below) are set to zero at the first symbol time (PAM pulse). The constellation encoder 310, sometimes referred to as a "mapper," in cooperation with the constellation mapping table 210 (FIG. 2) maps the bits on connections 308 and 311 into a signal constellation on connection 314.

The signal constellation on connection 314 is supplied to feedback precoder 316. Feedback precoder 316 comprises a filter 325, which can be, for example, a finite impulse response (FIR) filter configured to receive the signal constellation on connection 323. The filter 325 is followed by modulo quantizer 328. The precoder 316 maintains the average power of the signal on connection 323 so that the signal power remains within, for example, +/− one (1) volt. Specifically, if the value of the signal on connection 323 becomes too great, the precoder 316 subtracts a constant value from the signal, thus reducing the value of the signal. The signal on connection 314 is added, in adder 317, to the feedback output of modulo quantizer 328 via connection 324. This signal is output from adder 317 on connection 318 and supplied to optional $\mu$-law compander 319. The output of $\mu$-law compander 319 on connection 321 is supplied to adder 322. Adder 322 subtracts the output of filter 325 on connection 326 from the value of the signal on connection 321. The output of the adder 322 is the transmit signal on connection 323. Because the signal on connection 326 may have a large amplitude, the modulo quantizer 328 operates on the signal on connection 326 to maintain an average power level. If the voltage of the signal on connection 326 is greater than a preset value, typically half the distance between constellation points, then twice that value is subtracted from the signal by adders 317 and 322 until the signal is less than or equal to the preset value. Alternatively, if the value on connection 326 is more negative than a preset value, twice that value is added to the signal until the signal is greater than or equal to the negative preset value. For example, if the value of the signal on connection 326 is greater than one volt, the modulo quantizer 328 will subtract two (2) volts from the signal. In this manner, the feedback precoder 316 reduces the average power of the signal on connection 323 to always be within plus or minus one (1) volt above the signal on input line 314 in this example.

Optional inputs 362 and 323 to the modulo quantizer 328 may be used to further reduce the average power on output connection 323. The modulo quantizer 328 monitors the past history of the value of the output on connection 323 and may introduce additional offset vectors to realize a lower average power.

In accordance with an aspect of the invention, the input $c_n$ and output $y_n$ of adder 317 on connections 324 and 318, respectively, are also supplied to precoder state element 330. Precoder state element 330 monitors the precoder state for the transmit symbol (or pulse in the case of PAM) on connections 318 and 324. The trellis state is determined subsequently in trellis state element 340. The vectors $c_n$ and $y_n$ on connections 324 and 318, respectively, are supplied via switch 331 to the trellis interleaver 338.

For each transmit symbol the vectors $c_n$ and $y_n$, which are collectively referred to as the precoder state, define changes that have occurred in the state of the transmitted signal as a result of the feedback precoder actions. Trellis state element 340 will slice the $y_n$ vectors using trellis state slicer table 240. This will define a new trellis state or input vector for the trellis encoder 320. The vector $c_n$, on connection 324 further defines changes in the state of the transmitted signal. The vector $c_n$ is measured by modulo 2 counting the $c_n$ vectors. The least significant bit of this result is modulo 2 added to the final redundant trellis bit in trellis encoder 320 as described in ITU-T Recommendation V.34. To effectively interleave the trellis symbols each of these $c_n$ and $y_n$ vectors are saved and interleaved through the trellis interleaver 338.

The trellis interleaver 338 comprises a plurality of registers 341, 342 and 343. The switch 331 is operated via a signal on connection 333 from the same counter used to operate the switch 309. The switch 331 directs the output of the precoder state element 330 to connections 332, 334 and 336, and to registers 341, 342 and 343, respectively, for each symbol time. Therefore, the precoder state monitored by the precoder state element 330 for each symbol is sequentially loaded into the registers 341, 342 and 343. It should be noted that the three registers 341, 342 and 343 each include four locations (corresponding to the 4-dimension trellis coding described in this example).

The pulses output from the precoder state element 330 are supplied to the registers 341, 342 and 343, such that the first symbol (pulse) is supplied to register location 0 of register 341, the second symbol is supplied to register location 1 of register 342, the third symbol is supplied register location 2 of register 343, and the fourth symbol is supplied to register location 3 of register 341. This continues until 12 symbols (for this example a multi-symbol data frame of 12 pulses is used) until the 3 registers 341, 342 and 343 are full. As the registers are filled, each of the registers outputs its four symbols (in the form of bits) to the trellis state element 340. For example, the trellis state element 340 will include (at any given time) the symbols representing the trellis state in locations 0, 3, 6 and 9 from register 341, the symbols representing the trellis state in locations 1, 4, 7 and 10 from register 342, and the symbols representing the trellis state in locations 2, 5, 8 and 11 from register 343. The trellis state element 340 operates in cooperation with the trellis state slicer 240 (FIG. 2).

The trellis state element 340 slices the $y_n$ vectors from interleaver 338 using trellis state slicer table 240 to determine the trellis state for each trellis symbol received from the precoder state element 330. The trellis state element 340 then supplies the trellis state, or input vector, (for example, four bits for a 16-state code or 6 bits for a 64-state code) and modulo count on connection 347 to the trellis encoder 320. The modulo count is the least significant bit of the modulo 2 sum of all 4 vectors $c_n$ corresponding to the trellis symbol. On the last three symbols, the trellis encoder 320 uses the bits on connection 347 to generate the redundant bit. However, the four symbols that are used to generate the redundant bit on connection 349 are spread over 12 symbol periods. The trellis encoder 320 operates in cooperation with the trellis mapping table 220 (FIG. 2) to perform a logical operation on the bits on connection 347 to generate the single redundant bit on connection 349 for the last three symbols of the 12-symbol frame. The redundant bit on connection 349 is alternatively combined with the least significant bits on connection 304 (controlled by switch 309) and is supplied via connection 311 to the constellation encoder 310. Thus, burst errors are spread over multiple "trellis symbols", thereby reducing the total distortion of any one "trellis symbol." In this manner, the trellis encoder 320 generates the redundant bit on connection 349 using the four symbols contained in each of the registers 341, 342 and 343. In this manner, burst errors, which may corrupt several consecutive symbols, are reduced or eliminated.

The precoder state element 330 takes the first $c_0$ and $y_0$ symbol and places it in the first location (0) of register 341, and takes the second $c_1$ and $y_1$ symbol and places it in the first register location (1) of register 342. This sequence is repeated for twelve symbols. In this manner, consecutive symbols are placed in different registers. For example, the $1^{th}$, $4^{th}$, $7^{th}$ and $10^{th}$ symbols (the first symbol being assigned a zero "0") are placed in register 341, the $2^{nd}$, $5^{th}$, $8^{th}$ and $11^{th}$ symbol is placed in register 342, and the $3^{rd}$, $6^{th}$, $9^{th}$ and $12^{th}$ symbol is placed in register 343. Then, when the trellis state element 340 sequentially transfers the contents of register 341, 342 and 343, respectively, the four $c_n$ and $y_n$ symbols in each register are modulo counted and sliced respectively and supplied to the trellis encoder 320. However, because three registers are used (in this example), the symbols supplied to the trellis encoder are not in the same sequential order as when they were transmitted. In this manner, when trellis state element 340 analyzes the contents of register 341, the bits on connection 347 correspond to the four symbols (corresponding to the $1^{st}$, $4^{th}$, $7^{th}$ and $10^{th}$ symbols) on register 341.

During symbol times (pulses) 0, 1 and 2 the precoder effect is added to the PAM symbol generating a slicer signal and a precoder output on connection 318. The precoder state element 330 computes the trellis status (one of four symbols/pulses that define the final trellis state) and shifts that status into registers 341, 342 and 343 as described above. During pulses 3, 4, 5; and pulses 6, 7, 8, the steps repeat. On the $9^{th}$ pulse, the precoder effect is added to the $9^{th}$ PAM symbol without a least significant bit. The precoder state element 330 computes the $4^{th}$ trellis status (on symbol/pulse 9) and status bits 9, 6, 3 and 0 are provided to the trellis state element 340, which uses the trellis state slicer table 240 FIG. 2 to provide the bits representing the trellis state, or input vector, to the trellis encoder 320. The output of the trellis state element 340 also selects the least significant bit for the $9^{th}$ symbol sample.

The trellis encoder 320 develops the redundant bit on connection 349 that becomes the LSB for the $9^{th}$ symbol for input to the constellation encoder 310. The redundant bit supplied from the trellis encoder 320 offsets the constellation encoder 310 by an amount sufficient to alter the output of the precoder on connection 323. The $10^{th}$ and $11^{th}$ symbols also encode the least significant bit of symbols 10 and 11, thus completing the 12-symbol frame. The switch 309 selects the least significant bit input on the first 9 symbols and the redundant trellis bit (via connection 349) on the last 3 symbols of the 12 symbol frame. The switch 331 alternates the trellis status of each symbol into the three registers 341, 342 and 343 as mentioned above. On the $10^{th}$ symbol, the result in register location 9 completely fills register 341. Register 341 is processed by trellis state element 340 and the result is input to the trellis encoder 320, producing the redundant bit for the least significant bit of the $10^{th}$ pulse. Symbols 11 and 12 likewise use the value in the register location 10 of register 342 and the register location 11 of register 343, respectively, to produce the last least significant bits of the frame. This interleaves the four-dimensional trellis symbols. The trellis encoder 320 may also be interleaved using a delay of $Z^{-12}$ instead of $Z^{-4}$."

In this manner, the trellis encoder 320 generates the redundant trellis bit based on non-consecutive transmit symbols. Therefore, quantization noise that occurs over multiple symbol periods is significantly reduced or eliminated.

The output of feedback precoder 316 on connection 323 is supplied to scaler 352. Scaler 352 multiplies the constellation on connection 323 by a scale function of the data rate and supplies the scaled constellation on connection 354 to optional non-linear encoder 356. If included, the non-linear encoder 356 encodes the signal as described in commonly assigned U.S. Pat. No. 5,265,127 to Betts et al., entitled "Non-Linear Encoder and Decoder for Information Transmission Through Non-Linear Channels" dated Nov. 23, 1993. The encoded signal on connection 357 is then supplied to filter 358. The filter 358 will exhibit different characteristics depending on the type of modulation being used. For example, when PAM is employed, the filter 358 may not be required or may be a low pass filter that filters the passband of the signal. Alternatively, when using CAP modulation, the filter 358 is a Hilbert filter configured to receive the X and Y coordinates of the signal constellation on connection 357 and perform CAP modulation to provide a bandpass output on connection 359 at a certain frequency range. Alternatively, the filter 358 could be a modulator that receives the output of the constellation encoder 310 on connection 323 and that modulates the signal using a technique such as coded or uncoded quadrature amplitude modulation (QAM) as is known in the art. The modulator provides the sine and cosine components of the carrier frequency, or the X and Y values of the carrier frequency as is known in the art. In a DMT environment, the filter 358 can perform the inverse discrete Fourier transform (IDFT) of the signal on connection 357. It should be noted that in a DMT environment, a plurality of signal carriers, referred to as "tones," are each encoded with a signal constellation. The combined constellations form a transmit symbol. In DMT, the IDFT element transforms the set of all tones (in parallel or taken together at one time) into a sequence of tone samples that are serially output on connection 359. If DMT is used, then the trellis symbols would be interleaved across carrier tones.

The output of filter 358 is supplied via connection 359 to pre-equalizer 361. The pre-equalizer 361 operates on the signal on connection 359 to provide a pre-equalized signal on connection 362. In the upstream direction the remote receiver 220 in ISP 101 may use a network $\mu$-law analog-to-digital (ADC) converter operating on the network time base in central office 102. In this case the receiver cannot equalize or track the received signal. To compensate for this, the local transmitter in transceiver 200 at customer premises 108 pre-equalizes the signal to assure the pulses (for PAM) arrive at the ADC equalized and at the appropriate network sample timing phase. The signal on connection 362 is optionally supplied to the modulo quantizer 328 and also to the digital-to-analog converter (DAC) 364. The DAC 364 converts to the digital domain signals on connection 362 to the analog domain on connection 366. The analog signal on connection 366 is amplified by differential transmit amplifier 367, which is the line driver for the transmitter 300, for transmission via connection 209 to the line interface 212 of FIG. 2 and for transmission via communication channel 106. DAC 364 may include a filter (not shown) to help control the power spectrum density (PSD) for spectrum management.

Figure 4:
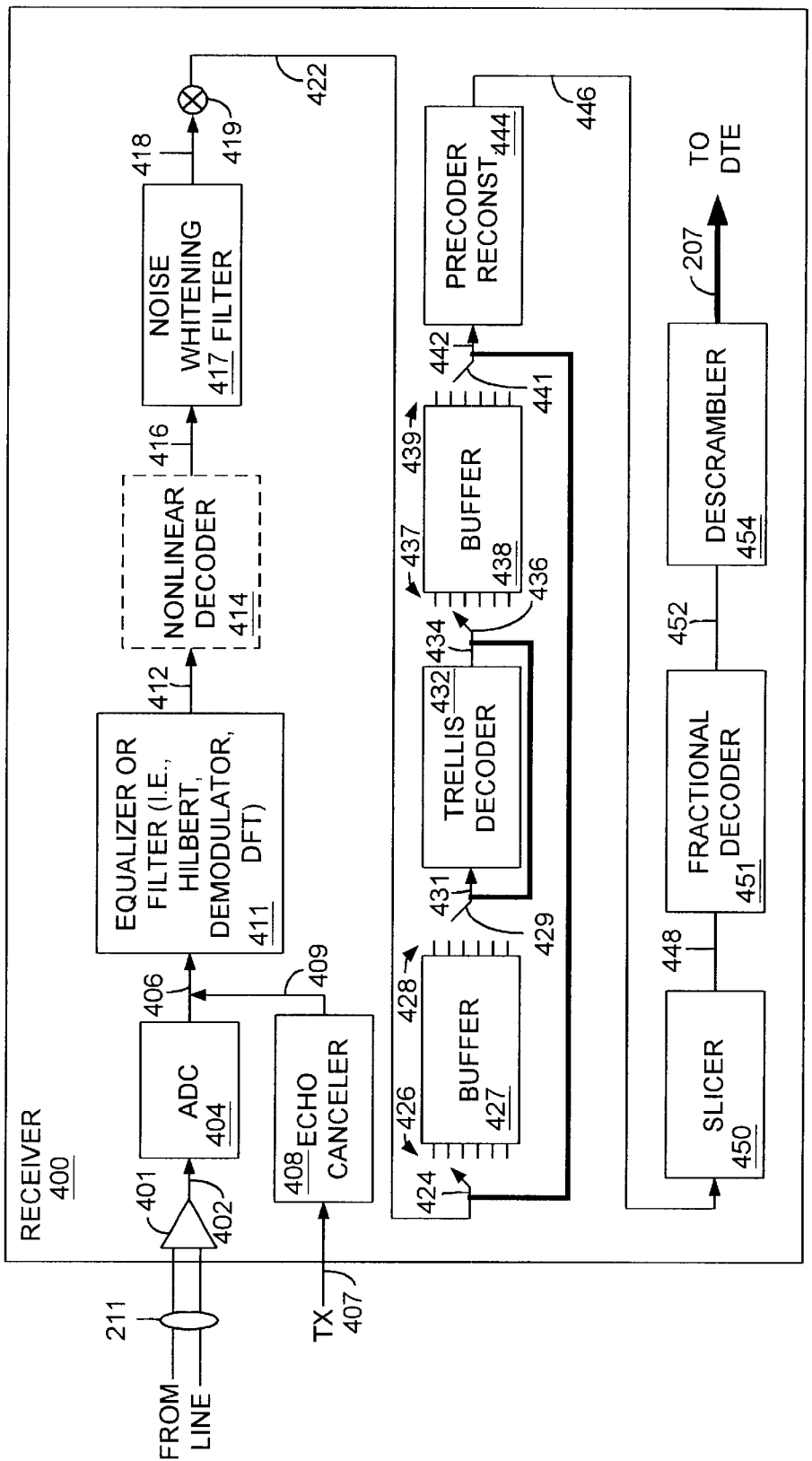
FIG. 4 is a block diagram illustrating the receiver of FIG. 2.

FIG. 4 is a block diagram illustrating the receiver 400 of FIG. 2. Although shown above in FIG. 2 as co-located, the following discussion will assume that the receiver 400 is remotely located with respect to the transmitter 300. A signal received on communication channel 106 (FIG. 2) is supplied via line interface 212 (FIG. 2) and via connection 211 to the analog-to-digital converter (ADC) 404. The ADC 404 may include a filter (not shown) and/or an equalizer (not shown) to help control undesirable signals and intersymbol interference. ADC 404 converts the analog signal received on connection 211 into a serial bit stream of time domain samples that represent, on connection 406, the signal constellation encoded in the transmitter (FIG. 3). In some applications, such as V.92, the ADC may be part of the network switching equipment and may not be co-located with the rest of the receiver equipment. In such a case, the precoder and pre-equalizer coefficients may be calculated at the receiver and sent to the transmitter during initialization. The receiver will design coefficients to optimize performance given the network sampling phase and the nonlinear quantization levels of the network $\mu$-law ADC.

The echo canceler 408 receives a signal from the local transmitter via connection 407, and provides an echo can-celled signal on connection 409 to connection 406 (the input of filter 411). During a training sequence, the echo canceler coefficients are initialized.

The serial bit stream on connection 406 is supplied to filter 411. The filter 411 performs the reverse operation of the filter 358 of FIG. 3 by demodulating the serial bit stream on connection 406. For example, in the case of PAM, the filter 411 may not be required or may be a low pass filter that performs the opposite operation of the low pass filter 358 in FIG. 3. Alternatively, in the case of CAP modulation, the filter 411 is a Hilbert filter that performs the opposite operation of the passband Hilbert filter in FIG. 3. Further, the filter 411 could be a demodulator that receives the output of the ADC 404 on connection 406 and that demodulates the QAM modulated signal as is known in the art. For DMT the filter 411 may perform the discrete Fourier transform (DFT) on the signal on connection 406. The output of the filter 411 is a demodulated signal representing the encoded constellation point and is supplied over connection 412 to the non-linear decoder 414.

The non-linear decoder 414 decodes the bit stream on connection 412 in accordance with that described in the above-mentioned U.S. Pat. No. 5,265,127. The output of the non-linear decoder 414 on connection 416 is supplied to the noise whitening filter 417. The noise whitening filter 417 performs the inverse operation of the precoder 316 (FIG. 3) in order to provide the correct channel response on connection 418 to scaler 419. Because the noise whitening filter 417 expands the constellation, the scaler 419 reduces the constellation size for input on connection 422, through switch 424, to the buffer 427.

The buffer 427 receives the serial bit stream on connection 422 through switch 424. The switch 424 at the input to buffer 427 and the switch 441 at the output of buffer 438 are linked switches that operate in unison. Symbols enter switch 424 and exit switch 441 in their original order, for example 0,1,2,3,4,5,6,7,8,9,10,11. The buffer 427 receives the serial bit stream through switch 424 in a parallel arrangement on lines 426. The output of the buffer 427 on respective parallel lines 428 is supplied through switch 429 to the trellis decoder 432. The trellis decoder 432 works in cooperation with the trellis slicing table 260 (FIG. 2) to decode the trellis bits that are included in the serial bit stream on connection 422. The switch 429 is linked to the switch 436 in a manner similar to that described above with respect to switches 424 and 441. Symbols enter switch 429 and exit switch 436 in their interleaved order, for example 0,3,6,9,1,4,7,10,2,5,8, 11. The output of trellis decoder 432 on connection 434 is supplied through switch 436 to the parallel input lines 437 of the buffer 438. The buffer 438 collects the symbols in parallel and provides them as output on connection 439 through switch 441 and onto connection 442. Thus, all received symbols (4 pulses in this example) of each multi-dimensional trellis symbol are trellis decoded sequentially together by the trellis decoder. Then, after decoding, which may entail delay, the decoded symbols are again buffered by buffer 438. Switch 441 extracts the symbols in their original transmitted order for precoder reconstruction and fractional decoding.

The output of buffer 438 is supplied via connection 442 to the precoder reconstruction element 444. The precoder reconstruction element 444 removes the modulo operation applied in the transmitter 300 (FIG. 3) by using a FIR filter and modulo operation (not shown) similar to those discussed in FIG. 3. The output of the precoder reconstruction element 444 on connection 446 is supplied to constellation decoder 450. Constellation decoder 450 employs constellation slicing table 250 (FIG. 2) to recover the original encoded signal point by supplying an index representing the constellation point received for each symbol. The output of the constellation decoder 450 on connection 448 is supplied to fractional decoder 451. The fractional decoder 451 performs the opposite operation of the fractional encoder 306 (FI(G. 3) and supplies the decoded signal on connection 452 to the descrambler 454. The descrambler 454 descrambles the signal to recover the original bit stream on connection 207, through the input/output element 202 (FIG. 2) and to DTE 110.

Figure 5:
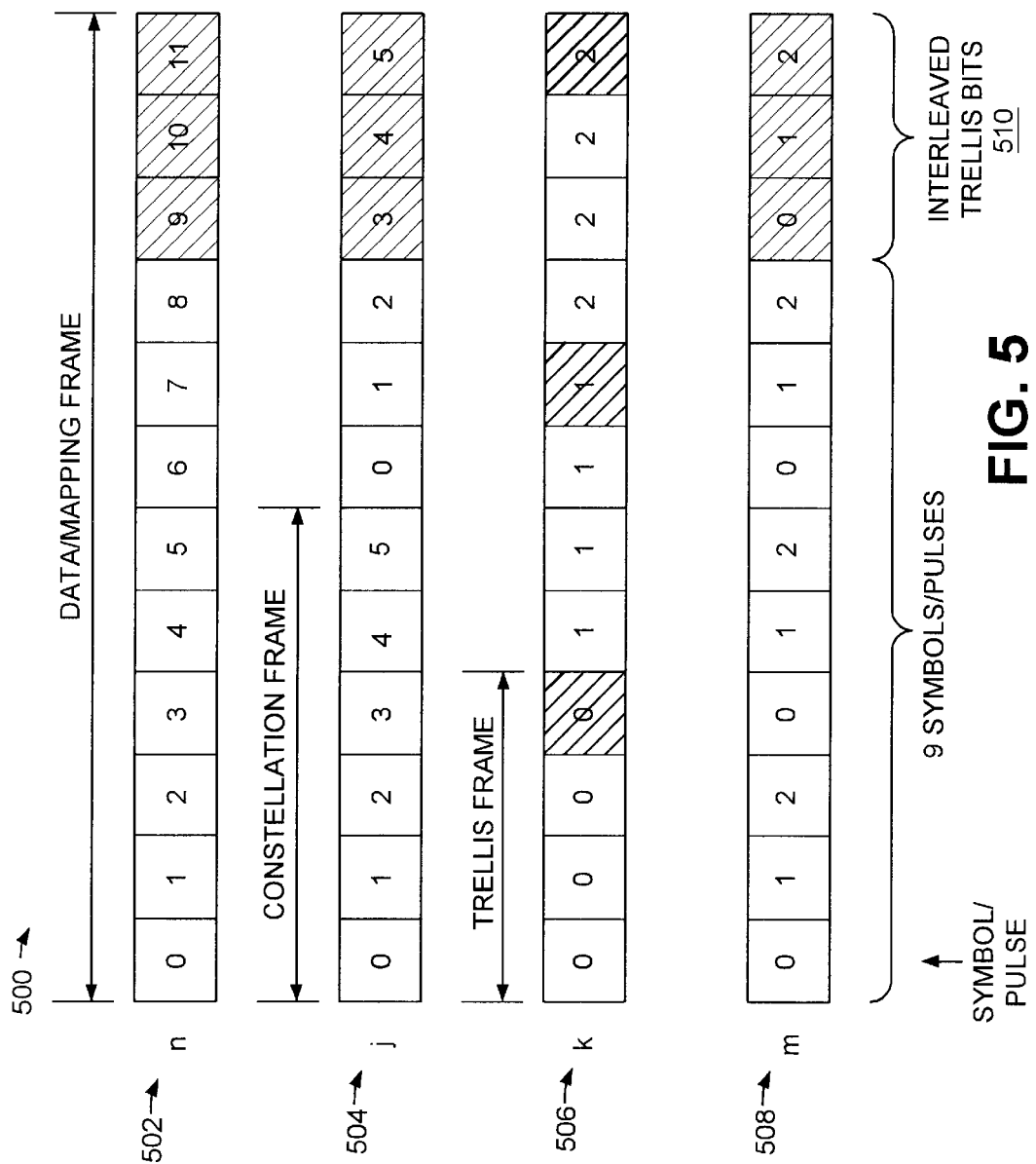
FIG. 5 is a graphical illustration of a 12-symbol mapping frame showing the interleaved trellis coding in accordance with an aspect of the invention.

FIG. 5 is a graphical illustration of a 12-symbol mapping frame showing the interleaved trellis coding in accordance with an aspect of the invention. The data frame 500 comprises twelve (12) symbols 502, two 6-symbol constellation frames shown using reference numeral 504, three 4-symbol trellis frames 506 and 12 trellis frames referred to using reference numeral 508. The trellis frames 508 may be interleaved and the symbols from each trellis frame spread over the complete twelve-symbol data frame. Channel impairments may include noise, distortion, residual echo and other disturbances. Under normal conditions these impairments are likely to corrupt multiple consecutive symbols. For example, impulse noise is likely to cause a disturbance spanning more than one symbol period. An impulse spanning the period of four symbols may corrupt all four symbols, which make up one trellis frame. Performance of the trellis decoder may be degraded under this condition. In accordance with an aspect of the invention, the trellis frame symbols are interleaved such that the same trellis frame generates no four consecutive transmitted trellis symbols. For example, the trellis frames 506, shown without interleaving, illustrate that for the first four transmitted symbols the values of trellis symbol "0" are sent consecutively. After interleaving, shown with reference to frames 508, all transmitted symbols of each trellis symbol are non-adjacent. Thus, a disturbance that spans three symbol periods will only impact a single symbol in each trellis frame.

The components of the constellation frames shown in FIG. 5 may be identified as Cnj, where n is the constellation frame number (502) and j is the symbol (504) within the constellation frame. The components of the trellis frame are identified as Tmk, where m (508) is the trellis frame number and k (506) is the symbol within the trellis frame. Using such nomenclature, the symbol ordering of the original frame is:

C00T00, C01T01, C02T02, C03T03, C04T10, C05T11
C10T12, C11T13, C12T20, C13T21, C14T22, C15T23.

In accordance with an aspect of the invention, the interleaved symbol ordering is:

C00T00, C01T10, C02T20, C03T01, C04T11, C05T21,
C10T02, C11T13, C12T22, C13T03, C14T13, C15T23.

Interleaving has a negligible impact on throughput delay. The trellis decoder (432 of FIG. 2) awaits a complete 12-symbol data frame before decoding. Trellis decoding begins after ten symbols of the data frame have been received. The last, symbol of the first trellis frame is transmitted in the $10^{th}$ symbol of the data frame. Decoding the constellation frames awaits the last symbol of the data frame. In this manner, trellis symbols are interleaved so that impulse noise spanning consecutive symbol periods will not corrupt the data signal.

While various embodiments of the invention have been described, it will be apparent to those of ordinary skill in the art that many more embodiments and implementations are possible that are within the scope of this invention. For example, although illustrated using PAM, other modulation techniques can benefit from the interleaved trellis encoding and preceding. Accordingly, all such embodiments are to be construed to be within the scope of the invention.

Therefore the following is claimed:

1. A system for data communication, comprising:
   a constellation encoder associated with a transmitter, the constellation encoder configured to receive a first and a second series of data bits and encode the data bits into a transmit signal, the transmit signal comprising a plurality of trellis symbols, the plurality of trellis symbols comprising a plurality of transmit symbols;
   a feedback precoder configured to maintain the magnitude of the transmit signal at a predefined level;
   a precoder state element configured to monitor a precoder state of the feedback precoder and develop a series of precoder symbols;
   an interleaver comprising a plurality of registers configured to receive the precoder symbols and store the precoder symbols in the plurality of registers using a first sequence of storage;
   a trellis state element configured to read the plurality of registers using a second sequence and develop a trellis state output; and
   a first trellis encoder configured to receive the trellis state output of the trellis state element and configured to generate at least one redundant bit that is a part of the second series of data bits provided to the constellation encoder.

2. The system of claim 1, wherein the plurality of transmit symbols are arranged in a 12-symbol frame and a first redundant bit is added to the tenth symbol as a least significant bit, a second redundant bit is added to the eleventh symbol as a least significant bit, and a third redundant bit is added to the twelfth symbol as a least significant bit.

3. The system of claim 1, wherein each trellis symbol of the plurality of trellis symbols comprises a group of four transmit symbols, and wherein one transmit symbol of the four transmit symbols includes a first redundant bit.

4. The system of claim 1, wherein the plurality of trellis symbols comprises at least two trellis symbols, and wherein a first of the two trellis symbols includes a first redundant bit and the other trellis symbol includes a second redundant bit.

5. The system of claim 1, wherein the first trellis encoder is configured to generate a first redundant bit; and further comprising a second trellis encoder that is configured to generate a second redundant bit; and a third trellis encoder that is configured to generate a third redundant bit.

6. A method for interleaving trellis codes in a data communication system, the method comprising the steps of:
   providing a data stream to a transmitter;
   converting the data stream into a first series of data bits comprising higher order bits of the data stream, and a second series of data bits comprising least significant bits of the data stream;
   providing the first and second series of bits to a constellation encoder associated with the transmitter;
   developing a transmit signal in the constellation encoder, the transmit signal comprising a plurality of trellis symbols, the plurality of trellis symbols comprising a plurality of transmit symbols;
   maintaining the magnitude of the transmit signal in a feedback precoder associated with the transmitter;
   monitoring a precoder state of the transmit signal at the output of the feedback precoder, and developing a series of precoder symbols;

providing the precoder symbols to a plurality of registers, the plurality of registers configured such that each successive precoder symbol is supplied to a different register;

determining the trellis state of each precoder symbol in the plurality of registers and providing the trellis state of each precoder symbol to a first trellis encoder, the trellis encoder configured to generate at least one redundant bit to be added to the second series of data bits provided to the constellation encoder.

7. The method of claim 6, further comprising the steps of:

arranging the plurality of transmit symbols in a 12-symbol frame; and adding a first redundant bit to the tenth symbol as a least significant bit, adding a second redundant bit to the eleventh symbol as a least significant bit, and adding a third redundant bit to the twelfth symbol as a least significant bit.

8. The method of claim 6, wherein each trellis symbol of the plurality of trellis symbols comprises a group of four transmit symbols, and wherein one transmit symbol of the four transmit symbols includes a first redundant bit.

9. The method of claim 6, wherein the plurality of trellis symbols comprises at least two trellis symbols, and wherein a first of the two trellis symbols includes a first redundant bit and the other trellis symbol includes a second redundant bit.

10. The method of claim 6, wherein the first trellis encoder is configured to generate a first redundant bit; and further comprising a second trellis encoder that is configured to generate a second redundant bit; and a third trellis encoder that is configured to generate a third redundant bit.

11. A method for trellis interleaving a precoded transmit signal, the method comprising the steps of:

providing a data stream to a transmitter;

developing a transmit signal in a constellation encoder associated with the transmitter, the transmit signal generated from a plurality of bits in the data stream and including a plurality of transmit symbols including a plurality of trellis symbols;

transmitting the transmit signal from the transmitter;

providing the transmit signal to a feedback precoder;

providing a series of precoder symbols from the feedback precoder to an interleaver comprising a plurality of registers;

interleaving the series of precoder symbols into the plurality of registers, the plurality of registers configured such that each successive precoder symbol is supplied to a different register;

determining the trellis state of each precoder symbol in the plurality of registers; and providing the trellis state of each precoder symbol to a first trellis encoder, the trellis encoder configured to generate at least one redundant bit that is provided to the constellation encoder, and wherein the at least one redundant bit is added to the plurality of bits from which the transmit signal is generated, thereby preventing adjacent transmit symbols from having the same trellis symbol.

12. A system for interleaving trellis codes in a data communication, comprising:

means for providing a data stream to a transmitter;

means for developing a transmit signal in a constellation encoder associated with the transmitter, the transmit signal generated from a plurality of bits in the data stream and including a plurality of transmit symbols, the transmit symbols including a plurality of trellis symbols;

means for transmitting the transmit signal out of the transmitter;

means for providing the transmit signal to a feedback precoder for maintaining the magnitude of the transmit signal;

means for providing a series of precoder symbols from the feedback precoder to a plurality of registers, the plurality of registers configured such that each successive precoder symbol is supplied to a different register;

means for determining the trellis state of each precoder symbol in the plurality of registers and means for providing the trellis state of each precoder symbol to a first trellis encoder, the trellis encoder configured to generate at least one redundant bit that is provided to the constellation encoder, and wherein the at least one redundant bit is added to the plurality of bits from which the transmit signal is generated, thereby preventing adjacent transmit symbols from having the same trellis symbol.

13. The system of claim 12, further comprising:

means for arranging the plurality of transmit symbols in a 12-symbol frame; and means for adding a first redundant bit to the tenth symbol as a least significant bit, adding a second redundant bit to the eleventh symbol as a least significant bit, and adding a third redundant bit to the twelfth symbol as a least significant bit.

14. The system of claim 12, wherein each trellis symbol of the plurality of trellis symbols comprises a group of four transmit symbols, and wherein one transmit symbol of the four transmit symbols includes a first redundant bit.

15. The system of claim 12, wherein the plurality of trellis symbols comprises at least two trellis symbols, and wherein a first of the two trellis symbols includes a first redundant bit and the other trellis symbol includes a second redundant bit.

16. The system of claim 12, wherein the first trellis encoder is configured to generate a first redundant bit; and further comprising a second trellis encoder that is configured to generate a second redundant bit; and a third trellis encoder that is configured to generate a third redundant bit.

17. A computer readable medium having a program for interleaving trellis codes in a data communication system, comprising:

logic for providing a data stream to a transmitter;

logic for developing a transmit signal in a constellation encoder associated with the transmitter, the transmit signal generated from a plurality of bits in the data stream and including a plurality of transmit symbols, the transmit symbols including a plurality of trellis symbols;

logic for transmitting the transmit signal out of the transmitter;

logic for providing the transmit signal to a feedback precoder for maintaining the magnitude of the transmit signal;

logic for providing a series of precoder symbols from the feedback precoder to a plurality of registers, the plurality of registers configured such that each successive precoder symbol is supplied to a different register;

logic for determining the trellis state of each precoder symbol in the plurality of registers and logic for providing the trellis state of each precoder symbol to a first trellis encoder, the trellis encoder configured to generate a at least one redundant bit that is provided to the constellation encoder, and wherein the at least one redundant bit is added to the plurality of bits from which the transmit signal is generated, thereby preventing adjacent transmit symbols from having the same trellis symbol.

18. The program of claim 17, further comprising:

logic for arranging the plurality of transmit symbols in a 12-symbol frame; and logic for adding a first redundant bit to the tenth symbol as a least significant bit, adding a second redundant bit to the eleventh symbol as a least significant bit, and adding a third redundant bit to the twelfth symbol as a least significant bit.

19. The program of claim 17, wherein each trellis symbol of the plurality of trellis symbols comprises a group of four transmit symbols, and wherein one transmit symbol of the four transmit symbols includes a first redundant bit.

20. The program of claim 17, wherein the plurality of trellis symbols comprises at least two trellis symbols, and wherein a first of the two trellis symbols includes a first redundant bit and the other trellis symbol includes a second redundant bit.

21. A system for data communication, comprising:

a precoder state element configured to monitor a precoder state of a feedback precoder and develop a series of precoder symbols;

an interleaver configured to receive and interleave the precoder symbols;

a trellis state element configured to receive the interleaved symbols from the interleaver and develop a trellis state output; and a first trellis encoder configured to receive the trellis state output of the trellis state element, the trellis encoder configured to generate at least one redundant bit that is a part of a plurality of data bits that is provided to a constellation encoder to generate a transmit signal wherein at least two transmit symbols of a first trellis symbol are interleaved with at least two transmit symbols of a second trellis symbol.

22. The system of claim 21, wherein one of the at least two transmit symbols of the first trellis symbol comprises a first redundant bit, and wherein one of the at least two transmit symbols of the second trellis symbol comprises a second redundant bit.

23. The system of claim 21, wherein the first trellis encoder is configured to generate a first redundant bit; and further comprising a second trellis encoder that is configured to generate a second redundant bit.

24. The system of claim 21, wherein the transmit symbol comprises "n" symbols that constitute an n-symbol frame.

25. The system of claim 24, wherein "n" is equal to twelve.

26. A method for interleaving trellis codes in a data communication system, the method comprising:

producing a series of precoder symbols;

interleaving the precoder symbols;

producing a trellis state output from the interleaved precoder symbols;

generating a first redundant bit in a part of a first plurality of data bits, based upon the trellis state output; and encoding a transmit signal using the plurality of data bits, wherein at least two transmit symbols of a first trellis symbol are interleaved with at least two transmit symbols of a second trellis symbol.

27. A system for interleaving trellis codes in a data communication system, the method comprising:

means for producing a series of precoder symbols;

means for interleaving the precoder symbols;

means for producing a trellis state output from the interleaved precoder symbols;

means for generating a first redundant bit in a part of a first plurality of data bits, based upon the trellis state output; and means for encoding a transmit signal using the plurality of data bits, wherein at least two transmit symbols of a first trellis symbol are interleaved with at least two transmit symbols of a second trellis symbol.

28. A computer readable medium having a program for interleaving trellis codes in a data communication system, comprising:

logic for producing a series of precoder symbols;

logic for interleaving the precoder symbols;

logic for producing a trellis state output from the interleaved precoder symbols;

logic for generating a first redundant bit in a part of a first plurality of data bits, based upon the trellis state output; and logic for encoding a transmit signal using the plurality of data bits, wherein at least two transmit symbols of a first trellis symbol are interleaved with at least two transmit symbols of a second trellis symbol.

* * * * *

UNITED STATES PATENT AND TRADEMARK OFFICE
CERTIFICATE OF CORRECTION

PATENT NO. : 6,715,124 B1 Page 1 of 1
DATED : March 30, 2004
INVENTOR(S) : William L. Betts It is certified that error appears in the above-identified patent and that said Letters Patent is hereby corrected as shown below:

Column 17,
Line 1, delete the word "a"

Signed and Sealed this

Fifteenth Day of June, 2004

JON W. DUDAS
*Acting Director of the United States Patent and Trademark Office*